United States Patent
Aggarwal et al.

(10) Patent No.: US 7,188,258 B1
(45) Date of Patent: Mar. 6, 2007

(54) METHOD AND APPARATUS FOR PRODUCING DUPLICATION- AND IMITATION-RESISTANT IDENTIFYING MARKS ON OBJECTS, AND DUPLICATION- AND DUPLICATION- AND IMITATION-RESISTANT OBJECTS

(75) Inventors: Gaurav Aggarwal, New Delhi (IN); Nabil Mahmoud Amer, Berkeley, CA (US); Vernon Ralph Austel, Cortlandt Manor, NY (US); Pradeep Kumar Dubey, New Delhi (IN); Ashutosh Kulshreshtha, New Delhi (IN); Marco Martens, Chappaqua, NY (US); Bruce Albert Scott, Tisbury, MA (US); Sean William Smith, Cornwall, NY (US); Charles Philippe Tresser, Mamaroneck, NY (US); Robert Jacob von Gutfeld, New York, NY (US); Steve Harris Weingart, Boca Raton, FL (US); Chai Wah Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/397,503

(22) Filed: Sep. 17, 1999

(51) Int. Cl.
*G06K 19/10* (2006.01)
*H04L 9/32* (2006.01)
*H04L 9/00* (2006.01)

(52) U.S. Cl. ............... 713/194; 235/487; 713/172

(58) Field of Classification Search ........... 713/168, 713/176, 194, 172, 189; 380/51; 235/487–494; 283/113; 427/7
See application file for complete search history.

(56) References Cited

U.S. PATENT DOCUMENTS

| | | | | |
|---|---|---|---|---|
| 3,795,805 | A * | 3/1974 | Swanberg et al. | 250/226 |
| 5,257,389 | A * | 10/1993 | Liu et al. | 382/305 |
| 5,426,700 | A * | 6/1995 | Berson | 713/186 |
| 5,434,917 | A * | 7/1995 | Naccache et al. | 713/176 |
| 5,452,357 | A * | 9/1995 | Naccache | 713/172 |
| 5,499,294 | A * | 3/1996 | Friedman | 713/179 |
| 5,581,257 | A | 12/1996 | Greene et al. | |
| 5,790,025 | A | 8/1998 | Amer et al. | |
| 5,949,881 | A * | 9/1999 | Davis | 713/189 |
| 5,974,150 | A * | 10/1999 | Kaish et al. | 713/179 |
| 6,028,936 | A * | 2/2000 | Hillis | 713/168 |
| 6,069,955 | A | 5/2000 | Coppersmith et al. | |
| 6,092,202 | A * | 7/2000 | Veil et al. | 713/201 |
| 6,131,090 | A * | 10/2000 | Basso et al. | 706/23 |
| 6,155,605 | A * | 12/2000 | Bratchley et al. | 283/72 |
| 6,233,339 | B1 * | 5/2001 | Kawano et al. | 380/44 |
| 6,297,888 | B1 * | 10/2001 | Noyes et al. | 358/1.9 |
| 6,309,690 | B1 * | 10/2001 | Brogger et al. | 427/7 |
| 6,397,334 | B1 * | 5/2002 | Chainer et al. | 713/176 |
| 6,543,685 | B1 * | 4/2003 | Lien et al. | 235/380 |

* cited by examiner

*Primary Examiner*—Gilberto Barrón, Jr.
*Assistant Examiner*—Matthew Heneghan
(74) *Attorney, Agent, or Firm*—Edmund Mizumoto, Esq.; McGinn IP Law Group, PLLC (57) ABSTRACT

A method (and system) for guaranteeing authenticity of an object, includes providing a sample of material obtainable only by at least one of chemical and physical processes such that the sample is random and not reproducible, associating a number reproducibly to the sample by using a specific reader, and forming at least one coded version of the number, the at least one coded version being obtained by a key signature, and the version being recorded into an area of the object.

34 Claims, 3 Drawing Sheets

METHOD AND APPARATUS FOR PRODUCING DUPLICATION- AND IMITATION-RESISTANT IDENTIFYING MARKS ON OBJECTS, AND DUPLICATION- AND DUPLICATION- AND IMITATION-RESISTANT OBJECTS

CROSS-REFERENCE TO RELATED APPLICATION

The present application is related to U.S. patent application Ser. No. 09/398,028, filed on Sep. 17, 1999, to Braudaway, et al., entitled "METHOD AND APPARATUS FOR REMOTE PRINTING OF DUPLICATION RESISTANT DOCUMENTS", and U.S. patent application Ser. No. 09/398,029, filed on Sep. 17, 1999, to Mengin, et al., entitled "METHOD AND APPARATUS FOR SECURE SALE OF ELECTRONIC TICKETS", and U.S. patent application Ser. No. 09/398,025, filed on Sep. 17, 1999, to Howard, et al., entitled "METHOD AND APPARATUS FOR VOUCHSAFING ELECTRONIC ORIGINALS", and U.S. patent application Ser. No. 09/398,203, filed on Sep. 17, 1999, entitled "SEMI-FRAGILE WATERMARKS", assigned to the present assignee, and incorporated herein by reference.

BACKGROUND OF THE INVENTION

1. Field of the Invention

The present invention generally relates to producing imitation- and duplication-resistant objects such as smart cards, and more particularly to producing hard to copy and hard-to-imitate identifying marks on objects, as well as hard-to-copy and hard-to-imitate objects such as smart cards, and to problems relating to the reader needed to utilize such cards.

Further, the present invention also relates to preventing adversaries from modifying the data and program content of such cards.

2. Description of the Related Art

One of a kind samples: The use of radio frequency automatic identification systems has been proposed as a general purpose authentication system in U.S. Pat. No. 5,581,257 by Morton Greene et al.

This system offers high security, and has been proposed for the protection of identification documents, credit cards, and money. In this system, processes generate one of a kind (e.g., unique), non-duplicable, samples of certain encapsulated metal fibers, randomly placed, so that the samples can be identified by some reading mechanism. For example, a mechanism may be employed which uses microwaves as an interrogating source. The tag contains hundreds of small metal fibers of random orientation and lengths encapsulated in a medium such as, for example, paper or plastic.

The chances of there being two tags having a same configuration that would give the same microwave signature upon interrogation are extremely improbable and are essentially zero. The reader can be part of the computer which verifies the rightful use of the computer by a potential user. If the signature read by the microwave reader is one that does not conform to the original reading of the card stored in the computer memory, or more generally in some database accessible by the computer, access to the computer will be denied.

An inhomogeneous media has been proposed in U.S. Pat. No. 5,790,025 as another example of an arbitrarily or randomly arranged medium which is interrogated by a coherent light beam by way of the detected optical scattering from the material. Its main purpose is to detect intrusion into a protected area. Thus, if one tries to change the medium in any way, the original pattern of the scattered coherent light will be changed and in the present application, the computer will not operate.

Here, reading is accomplished using the light beam from a solid state laser diode in combination with a small scanning mirror and optical detector, all of which may be an integral part of the computer. If the randomly arranged medium on the card has been altered for an attempted illegal intrusion, the pattern stored in the computer memory will not match the pattern scanned and the computer will not operate.

Other examples of samples for which only one of a kind exist are given by glasses and crystallites which can have a uniquely random set of defects or features. These features result in a unique configuration of colors and/or fractures which gives a complicated, irreproducible stable pattern once cooled. Cooling generally occurs because many of these configurations are formed at high temperatures and subsequently in many cases quenched, thereby giving these unique patterns in the form of dislocations, cracks, grain boundaries and colors, as described above. Rocks such as shale, marble, granite, sandstone, and limestone can also have unique features.

Any of the materials discussed herein having considerable hardness can be made scratch- and tamper-resistant by covering the sample with thin layers of diamond-like carbon, using techniques well known in material sciences, and commercially provided by various companies such as General Vacuum Inc. of Cleveland, Ohio.

Smart cards: Smart cards have been proposed as a technology offering the possibility of secure off-line transactions. However, recently, several successful attacks on conventional smart cards have been reported (see, for example, R. Anderson, M. Kuhn; "Tamper Resistance—A Cautionary Note." *The Second USENIX Workshop on Electronic Commerce*, November 1996, R. Anderson, M. Kuhn; "Low Cost Attacks on Tamper Resistant Devices." Preprint. 1997, and P. Kocher, J. Jaffe and B. Jun, "Introduction to Differential Power Analysis and Related Attacks" *Manuscript*, Cryptography Research, Inc. 1998). One such reported attack allows cracking of the digital code which is supposed to warranty the security of the card, by inferring conclusions of the code from observations of electrical currents, power consumption, and other electromagnetic manifestations in the card during use. Other low-cost attacks are similarly known on current smart card technology.

Given the benefits that banks, credit card companies, and other users were expecting from a wide acceptance of the security offered by smart cards, it is important to be able to overcome the lack of security offered by present day smart card technology.

Indeed, several improvements of the original design have been proposed (and this process may continue in the future). However, since the above-described, successfully mounted attack only needs some of the electrical analysis and possibly the physical attacks one could perform on smart cards, the desired level of confidence will likely not be restored so long as solutions only push further the original (and conventional) idea of enclosing all the security in the card.

Problems to be Solved

Thus, some radically new approaches must be used to protect smart cards from illicit duplications and hard to detect illicit imitations, preferably allowing off-line authentication. Hitherto the invention, such approaches have been unknown. One approach may include ensuring the physical security of the card, but this might not be sufficient to prevent the production of huge amounts of false smart cards once one of them has been successfully attacked.

It is also important to improve other payment systems, such as telephone cards, as they help make many aspects of life easier, and to help improve protection against counterfeiting and "grey market" goods as all honest customers eventually pay for the existence of counterfeiting and grey markets.

Given the off-line and computational nature of smart cards and similar technologies, the problem is not just preventing the adversary from extracting secrets and duplicating cards, but also from maliciously altering functionality and/or state in otherwise legitimate cards.

Hitherto the present invention, the conventional systems and methods have failed to recognize such problems and certainly have failed to provide an adequate solution to such problems.

Also, an efficient method for protection against counterfeiting of goods has been proposed in U.S. patent application Ser. No. 09/060,026, filed on Apr. 14, 1998, by Coppersmith et al., entitled "System for Protection of Goods Against Counterfeiting", and incorporated, but it only applies to goods such that each authentic item carries a different serial number and does not protect against cloning: protection against cloning is certainly an open problem, and improved methods to fight again such malicious attacks are provided by the present invention for a variety of goods including, but not limited to, smart cards.

SUMMARY OF THE INVENTION

In view of the foregoing and other problems, drawbacks and disadvantages of the conventional methods and systems, an object of the present invention is to provide a structure (e.g., content-carrying object, device, etc.) with increased security.

Another object is to provide a smart card having increased security.

In a first aspect of the present invention, a method of guaranteeing authenticity of an object, includes providing a sample of material obtainable only by at least one of chemical and physical processes such that the sample is random and not reproducible, associating a number reproducibly to any such sample by using a specific reader, and forming at least one coded version of the number, the at least one coded version being obtained by a key signature, and the version being recorded into an area of the object.

Further, the present invention discloses a new implementation of smart cards and discloses the readers which can be used in combination with such smart cards. It is noted that by using, for example, some zero-knowledge protocol, a smart card can be authenticated but, reputedly, cannot be duplicated. A general reference to smart card technology and applications can be found in "Smart Cards: A Guide to Building and Managing Smart Card Applications," by Henry Dreifus and J. Thomas Monk, John Wiley & Sons, 1998.

Hereinafter, any electronic component using such technology which has some memory and/or some processing capabilities, will be called "a smart component" or "a chip" or "a smart card", even if it does not actually take any form resembling a card.

One of the main virtues attributed to smart cards is that some transactions based on smart cards, such as payments and authentication can be performed using smart cards, without connection to a database. Of course, this freedom from a link to a database is an advantage only as long as the secrets in the card resist attacks. Thus, it is quite crucial to make cards very hard to imitate and duplicate.

In many previous attempts, all secrets (and security) were maintained on the card. In contrast, the present invention provides a method where part of the "secret" (e.g., such as the private cryptographic key) is not on the card, and yet off-line transaction is still possible.

Furthermore the present invention distinguishes itself from previous methods where also private keys were kept off the card, by equipping the card with at least one one-of-a-kind sample cryptographically linked to some information carried on the card. This enables cloning protection.

Besides making the smart card hard-to-imitate, the present invention also uses this property as a foundation for making the function and state of the card hard to alter, even if this function and state are dynamic.

The nature of the present invention is such that it applies equally to other payment systems, such as telephone cards, which may or may not implement a smart card element.

The present invention also discloses how to attach marks to objects such that they are so difficult to imitate and duplicate that counterfeiting, in a way which deceives the customer, is made extremely hard. In that respect, the present invention builds on and improves on the inventions disclosed in the above-mentioned U.S. patent application Ser. No. 09/060,026, incorporated herein by reference.

Thus, the present invention does not only apply to smart cards, but also applies to other media such as CD-ROMs or DVDs that carry audio or video content, and more generally to any object to which a non-reproducible sample of material and an encoded version of some information, which can be extracted from the sample by some reader, can be attached (where attachment can be for instance in the form of embedding in the object, writing on the object, or any other form).

Along with the method of the invention, a system and signal-bearing medium also are provided.

Thus, with the unique and unobvious features of the present invention, counterfeiting will be easily detected, if not prevented, and the confidence in content-carrying-device-technology, such as "smart card" technology, will be increased.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Referring now to the drawings, and more particularly to FIGS. 1–6, there are shown preferred embodiments of the method and structures according to the present invention.

The Smart Card Context

As an exemplary (but non-limiting) implementation, the present invention will be applied to "smart card" technology. As will be evident to one of ordinary skill in the art, the present invention is not limited to such an application, but, of course, can be practiced in a variety of other applications, some of which will be described in the sequel.

Generally, in the framework of smart cards, the present invention provides a method based on cryptography in which the cryptographic key is not carried on the smart card. Furthermore, the present invention distinguishes itself from conventional methods where also private keys were kept off the card, by equipping the card with at least one one-of-a-kind sample cryptographically linked to some information carried on the card, thereby enabling cloning protection.

Previous art in the security of smart cards prevents the creation of a counterfeit card which will be different from the legitimate card, but does not prevent the fabrication of as many clones one wishes of a given legitimate smart card.

In contrast, the present invention provides a mechanism of protection designed to prevent both exact copy (or cloning) and creation of new cards. The card (or other carrier of the overall system, but the word "card" is used for convenience and for definiteness for the reader) will carry some chosen type of chip (or a more general mechanism for storing information), as described below with reference numerals 102, 105, 208, etc.

Along with the chip (or the chosen more general mechanism for storing information), the card also carries a sample S0 of some material extremely difficult to reproduce with sufficient precision, such as certain crystals, glasses, epoxy samples, rocks, materials with random inclusion such as hundreds of small metal fibers of random orientation and length encapsulated in a medium, as described above. The chances of there being two devices of a same kind that would give the same signature (optical, microwave, magnetic, etc., depending of the kind of sample being used) upon interrogation are essentially zero.

Furthermore, in the case, for example, of glass with a complicated structure as described previously, modification of a sample to resemble another, complicated, sample is extremely hard to achieve, as local alterations of the glass would be easily detectable (e.g., any sample with non complicated structure will be declared a priori non-valid for use according to the present invention, using methods for recognizing simple samples to be described below under the title "The Sample Unpredictability Test").

Thus, the basic and general idea of the invention can be described as follows.

Specifically, a number is associated by some reader to S0, and an encrypted version of this number is written in the smart element or on its support. Duplication is impossible as another sample will be different. Imitation is also impossible because a different sample yields a coded version which cannot be obtained by the counterfeiter since the key used to generate this coded version is kept secret.

The present invention also utilizes public key cryptography for verification of authenticity. Of course, it can be easily adapted to use only private key cryptography, as anybody versed in the art of cryptography would readily understand. In the context of the use of public key cryptography, it will often be said that some information must be known publicly. Several methods, such as the World Wide Web, can be used to make such information available to the general public, or to some targeted set of users considered as the public users.

It is noted that the physical sample S0 on the card may degenerate over time due to various reasons like sunlight, scratches, earth's magnetic field etc. resulting in a different sample, denoted by S.

Then, some specific reader R0 belonging to the party which creates the card or an agent thereof gives a representation R0(S0) of the sample (in general, S0 will be used for the sample at the time of first reading by a reader, and S will be used for what this original sample has evolved afterward, even if the sample has remained essentially unchanged, although in specific cases when the sample is unchanged, using S0 to designate it at later times is also appropriate). This representation can then be digitized, yielding a vector N(R0(S0)) of real or integer numbers. The vector N might be a scalar number with a large number of digits, say 1,000 to 1,000,000, or at the other extreme might be a vector with large dimensions, say 1000.

Using a secure hash function H, as described for instance in "Handbook of Applied Cryptography", by Alfred J. Menezes, Paul C. van Oorschot and Scott A. Vanstone, *CRC Press*, 1997, the vector N(R0(S0)) is first hashed in some applications where N is very long. Hashing produces H(N0(R0(S0))), and H(N0(R0(S0))) (or N0(R0(S0)) in the case no hash is used) is then appended with optional external data Opt related to the smart card application.

By "optional data", it is meant that such data is not necessary for the basic mechanism of the invention, but it may be mandatory to use such data for some application. The optional external information may be, for example, a date of issue of the card, the card manufacturer's name, the name of the user of the card if known at the time the card is created, functionality of the application, important information such as how much money is carried in the card, etc. Appending Opt or not results in a small number n=n(N(R0(S0)), Opt), about 1024 bits long if Rivest-Shamir-Adleman (RSA) signature is used, or less if elliptic curve-based methods are used (e.g., such numbers may need to be increased depending upon the designer's needs and constraints).

The optional external data Opt can also be stored in the smart card separately (unencrypted) and will need to be stored this way in some cases when public key cryptography is to be used.

Next, public key cryptography with associated encoding and decoding functions V and V−1 are used (notice that in all cases where public key cryptography is to be used, the hash function used is preferably made public and/or will be used in the reader). As is well known (e.g., see "Handbook of Applied Cryptography", by Alfred J. Menezes, Paul C. van Oorschot and Scott A. Vanstone, CRC Press, 1997), the function $V^{-1}$ is known publicly, but V is known only to some party called "the owner" and is secret in the sense that it is considered computationally infeasible to determine it from $V^{-1}$. The owner can then compute a card state certificate $C=V(n)$ and inscribe it in the chip (or more general mechanism to store information). It is noted that when Opt contains crucial information, such as a money amount contained in the card, C guarantees both the originality of the sample and such important information.

The public key pairs V and $V^{-1}$ can be replaced by a new pair after a period of time. In this case, a date should be put (permanently) into the smart card so that the correct public key pairs can be determined. As would be known by one of ordinary skill in the art taking the present application as a whole, the above scheme can be generalized to any standard public-key signature or keyed Message Authentication Code (MAC) scheme.

When verifying the authenticity of the card, N(R(S)) is treated in a way similar to what has been described for N0(R0(S0)), and using $V^{-1}$, authenticity can be checked as usual in the art of cryptography.

There are many important aspects and benefits of the present invention. For example, such a card cannot be cloned since: 1) the physical system producing S will essentially always produce different samples (e.g., more precisely samples which are sufficiently different) to yield quite different digitization; and 2) the sample cannot be imitated using a different, less unstable, production process which would produce other samples indistinguishable from the original one when processed by a reader.

Further, the card cannot be imitated by creating new pairs of the form (S, V(n)) as V is unknown, except to the legitimate originator of the cards or its agent.

Additionally, the card can be made immune to the instability of the physical system producing S, using the statistical properties of the degeneration process of the physical sample.

Furthermore, the predictable nature, if any, of the degeneration process can be used to detect cloning of the card or to limit the duration of validity of the card.

Figure 1:
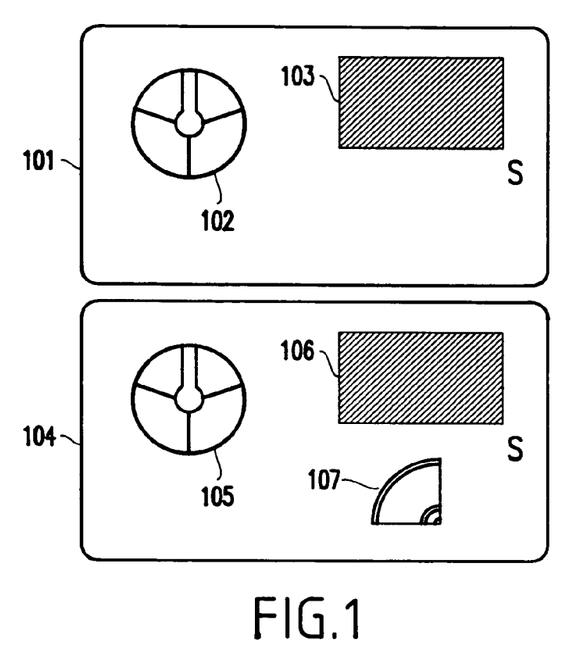
FIG. 1 is a block diagram of possible formats for objects (e.g., smart cards or the like) according to the present invention, depending on whether the reading from the sample S is exact or "fuzzy" (as defined below)

Referring now to FIG. 1, there is shown in block diagram form the format of a card 101 incorporating a chip 102 according to the present invention.

In case the reading of the sample S can be done in exactly the same manner in each occurrence (as would be the case, e.g., for a variety of minerals such as rocks and for some glasses which are suddenly quenched from high temperatures or from the melt, and subsequently covered with diamond-like carbon film), the card 101 carries a chip 102 and the sample 103. By "a reading made in exactly the same manner", it is meant that either that at each reading one expects that R(S)=R0(S0) will hold true, where R is any reader of the proper kind, or that one expects that R(S) and R0(S0) are perfectly compatible as defined below in the section "Processing of the information captured by the reader", where processing of R(S) and R0(S0) are defined.

In case the reading is fuzzy (by which is meant the readings are not always exactly the same as define above, but are essentially the same in ways to be defined latter on, in the subsection "Fuzzy Reading") the card 104 carries a chip 105, a sample S at 106, and, for some implementations, a recording 107 of the digital representation of S0 from the reader R0 of the subject who originates the card.

The present invention will be described on the basis that public key cryptography is used, which allows for more types of applications. Clearly, secret keys could be used in some specific cases, and anyone ordinarily skilled in the art would know how to implement the simpler case of the secret keys on the basis of what is disclosed herein.

Hereinbelow is described a method of how information can be recorded on the card and recovered from it to check authenticity, depending on whether the reading is exact or fuzzy. First, a general framework for these operations will be provided. Specific cases, as determined by the choice of the physical sample S and the reader, will be detailed afterward.

Readers:

The readers R and R0 of the sample S or S0 should preferably be such that the sample cannot be replaced by an imitation of it produced by a simple copying process. For instance, a reader producing only a simple image of S would not be appropriate since a picture of S, as obtained by photographic methods, could deceive the reader and mistake the easily produced picture for an original sample. It is noted, however that to limit cost, one may choose such simple readers, and discard photographic and other simple copies of S by visual inspection of the sample.

Thus, in case the information content in S is visual, the reader may incorporate results of various illuminations of S so that the three-dimensional structure of S as a whole participate to what is captured by the reader. A simple system to this effect is to have several laser beams at different angles and an imager (by which is meant some apparatus measuring input light such as a digital camera, one or a plurality of photoelectric cells, etc.) to capture the result of the different illuminations. Such a configuration may be used for instance when the sample has some transparency and is applied on a reflecting surface incorporated in the object to be protected. Polarized light can also be used in this context, as is often the case in the art of identifying three-dimensional objects. For instance, small inclusions with different polarization can be embedded before solidification in some transparent substrate such as glass, resin, etc., applied on a part of the object to protect, which part is also transparent. Lights at different polarization will be sent through the sample and captured by an imager. In another sort of samples, microwave or other radio frequency readers would be used as described in U.S. Pat. No. 5,581,257 by Morton Greene et al.

In some applications, it may be important to protect the reader R0 used when creating the card, and possibly also all readers R which may be involved in some verification process. To this effect, for instance, the reader to be protected includes physically protected tamper-resistant hardware with a tamper-responding circuit, such as the IBM 4758 cryptographic coprocessor.

Processing of the Information Captured by the Reader:

The reader, as described in general terms above, can capture information out of the sample either by a scanning method, or globally. The art of associating numbers to data (or digitalization) is well known, but for specificity, we describe here some methods particularly well adapted for the context of the present invention. For simplicity, only the case when R(S) close to R0(S0) implies that the digitization N(R(S)) is close to N(R0(S0)) will be considered. This does not entail any serious lack of generality as the digitalization can be chosen accordingly, as demonstrated in the examples of digitalization describe below.

In the scanning case, the sample is thought of as carrying an invisible grid with Hor elements in the horizontal direction and with Ver elements in the vertical direction, defined once and for all for any given application, with cells designated by a pair of indices (i,j) where i, with 0<i<Hor+1, is the ranking number on the cell of the grid in the horizontal direction, say from left to right, and j, with 0<j<Ver+1, is the ranking number on the cell of the grid in the vertical direction, say from top to bottom. It is assumed here that only one reading is performed per cell (e.g., a single laser angle, or a single polarization from what is described above with regard to readers) as the more general case is adapted readily by anyone trained in the art of digitizing data. The reader will associate some number $x(i,j)$ to each cell $(i,j)$ of the grid. Out of this collection of numbers, one forms a vector $$VEC1=(x(1,1),x(1,2),\ldots,x(1,Hor),x(2,1),\ldots,x(Ver,Hor))=(v1,v2,\ldots,vQ).$$

where $v1=x(1,1)$, $v2=x(1,2)$, and so on, and Q stands for the product Ver·Hor.

In the global reading case, several well known methods allow associating a vector of numbers $VEC1(v1, v2, \ldots, vQ)$ to the reading. For example, one may take the Fourier spectrum of the signal captured by the reader, split the frequency domain in Q slots, and define $v(k)$ as the integral of the spectrum in the $k^{th}$ slot.

Once the vector VEC1 has been formed (either directly in the reader or in the processor depending on the specific application), one proceeds to transform it to a vector whose entries are an integer in most cases. It is usual to get entries which are 0 or 1. In the present case, entries in the set $\{0, 1, 2\}$ are preferable to make clear some key aspects of the inventions, although the choice of the set of digits to be used is fundamentally irrelevant and can be changed according to preferences and the precise application at hand.

It is denoted by Max the maximal value that any $v(k)$ can take, by Min the minimal value, and by $Med=(Max+Min)/2$ the median value (in full generality, these quantities may depend on k, and the definition of Med can be changed for instance to the point between Min and Max so that $v(k)$ falls with equal probabilities between Min and Med or between Med and Max: this all is easily adapted as needed by anyone with sufficient mathematical sophistication). For simplicity, we choose to set Min=0, Max=1 and accordingly Med=1/2, which can always be achieved by proper renormalization of $v(k)$. Then, a positive number e is chosen smaller than 1/6 (the actual value of e depends on the application at hand and remains fixed once the application is specified. Also, this value is known publicly when one desires the invention to be used in the context of public key cryptography). Then, an integer $Int(k)$ is defined by the formula:

$Int(k)=0$ if $v(k)<Med-e$, $Int(k)=1$ if $v(k)>Med+e$, $Int(k)=2$ otherwise.

Then, a second vector VEC2 is defined as:

$$VEC2=(Int(1),Int(2),\ldots,Int(0)),$$

and correspondingly a number $$N=Int(1)Int(2)\ldots Int(Q)$$

where juxtaposition stands for concatenation of the digits. Thus N is a ternary number, i.e., it is written in base 3. In the sequel, N0 will stand for the similar number N obtained out of the sample S0 by the original reader R0.

The method of digitization presented so far will be particularly valuable in the cases when no hash function is used before coding (e.g., termed herein as the small N case). Otherwise (e.g., in the big N case), one may use a more conventional definition of the Int function such as:

$Int(k)=0$ if $v(k)<Med$, $Int(k)=1$ otherwise.

Now, a definition of perfect compatibility is given as needed to distinguish those exactly readable cases when one cannot expect the relation $R(S)=R0(S0)$ to hold true. To this effect, an integer $Int3(k)$ is defined by the formula:

$Int3(k)=0$ if $v(k)<Med-2e$, $Int3(k)=1$ if $v(k)>Med+2e$, $Int3(k)=2$ otherwise, and a third vector VEC3 as $$VEC3=(Int3(1),Int3(2),\ldots,Int3(0)),$$

and correspondingly a ternary number $$N3=Int3(1)Int3(2)\ldots Int3(0)$$

where, again, juxtaposition stands for concatenation of the digits. It is noted that the maximal value 1/6 which has been given to e corresponds to the choice of the factor 2 in the formulas Med−2e and Med+2e above, in the definition of Int3. Other values of the maximum and of the factor in front of e can be more appropriate in some cases. Anyhow, these values must be known publicly to allow use of public key cryptography. Given a sample S, when one expects exact reading but one cannot expect the relation $R(S)=R0(S0)$ to hold true, one computes N3. It is termed that N0 and N3 (or $R(S)$ and $R0(S0)$, although only N0 and N3 appear in the formulas below) are perfectly compatible if and only if the following four conditions all hold true:

for each i, if $Int(i)=2$ then $Int3(i)=2$,
for each i, if $Int3(i)=0$ then $Int(i)=0$,
for each i, if $Int3(i)=1$ then $Int(i)=0$.
$|\#2(N0)-\#2(N3)|<T$, where $\#2(X)$ stands for the number of digits "2" in the ternary number X, and T is a threshold fixed according to the application being considered (otherwise speaking, the numbers of digits 2 in N0 and N3 are judged sufficiently close to each other for the specific application being considered).

In some applications, it may be important to protect the processor used when creating the card, and possibly also all processors which may be involved in some verification process. To this effect, for instance, the processor to be protected includes physically protected tamper-resistant hardware with a tamper-responding circuit, such as the IBM 4758 cryptographic coprocessor.

With the same purpose of protecting the crucial stage of card generation, one can, in conjunction with or instead of using physically protected tamper-resistant hardware, use a plurality of processors which will each generate a part of the secret information to be embedded in the cards. A simple way to implement this level of security is to use concurrently several key pairs. At the time of creation of the card, several processors each create on private key and at control time, either on, several, or all corresponding public keys are used depending on the application at hand.

The Sample Unpredictability Test

For the present invention to be effective, the samples used on the smart card must be sufficiently unpredictable (i.e., spatially chaotic, complex), and samples which do not satisfy the unpredictability condition should be discarded at the stage of creation of the card, as well as recognition of such sample when checking for authenticity should result in rejection of the card: the process which performs this control will always be assumed to be present, for instance (with reference with FIG. 2 which will later be described more globally) incorporated in the processor 203 which treats the reader's 202 output. Thus, further methods are proposed to test this unpredictability, which go under the generic name of "entropy of a sample". For example, let x be a binary expression for the observed N0(R0(S0)) or N(R(S)), that is x=(x1,x2 . . . xL) is a word with the symbols 0 and 1 of length L (one could also use ternary representations, as generated by the methods described previously, but anyone versed in the art of information theory would readily know how to consider such diverse cases).

For such a word, an unpredictability entropy can be defined as follows. First, choose a small number p and consider the set Wp consisting of all binary words of length p. For word w in Wp, the number Nw of times that w appears in x is counted. The frequency of the word w in x is denoted by Mw=Nw/L. The unpredictability entropy of the sample S or S0 is defined to be $H = \Sigma_{w \in W_p} Mw \ln(Mw)$. The sample will be accepted as sufficiently unpredictable if its entropy H is above a chosen threshold H0<ln(2) (where 2 depends on the choice of a binary representation, as ln(2) would be replaced by ln(q) for a representation in base q).

Exact Reading

Figure 2:
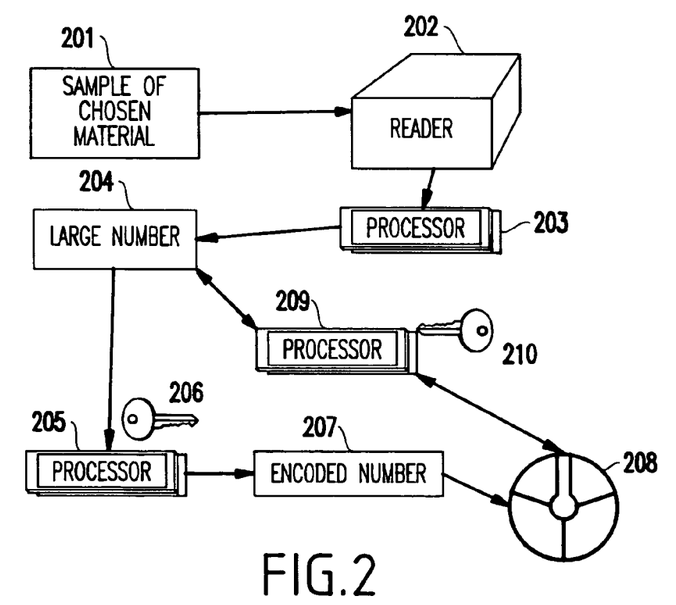
FIG. 2 is a flow diagram showing the process of equipping the smart card with the relevant supplementary information, and showing how to check authenticity of the card, in the case of exact reading according to the present invention.

With reference now to FIG. 2 corresponding to the case of "exact" reading, a sample 201 of material (e.g., a variety of minerals such as rocks and some glasses which are suddenly quenched from high temperatures or from the melt, subsequently covered with diamond-like carbon film) to be put on (e.g., affixed, mounted on, integrally formed therewith, etc.) a card is read by a reader 202 as described above.

When creating the card, the result of the reader is sent to a processor 203, which associates with the reading of S0 a large number N0 at 204 as described above in the section "Processing the Information Captured by the Reader". Typically, N0 is of the length required by the cryptographic method to be used (or of length a small multiple of that, in which case the number is separated in segments of the proper length as is usual in the art) in the case when one expects N0 and N3 to be perfectly compatible.

When one expects R(S)=R0(S0) to hold true, preferably the number N0 is as large as possible in order to minimize the chance of duplication, but then a hash function (such as SHA-1, as fully specified in the Federal Information Processing Standard Publication 180-1) has to be used (the chosen hash function must be known publicly to allow use of public key cryptography).

Then, the number N0 204 is sent to a second processor 205 which contains the secret part 206 of a public key signature scheme, and also a hash function as discussed previously in the case when one expects R(S)=R0(S0) to hold true. Given N0 204, the processor 205 computes the coded version C=V(n) 207 of n, where the number n stands for:

the number resulting from appending N0 204 with some optional data Opt in the case when one expects R(S) to be perfectly compatible with R0(S0), the number resulting from appending the hash H(N0) of N0 204 with some optional data Opt (as discussed previously) when one expects to have R(S)=R0(S0).

Typically, n should preferably be at least 1024 bits long at least for RSA public key cryptography as 512-bit public key cryptography is now typically considered insecure. Other methods such as elliptic curve can be securely implemented with less bits. Of course, any length is acceptable so long as security is provided adequate to the designer's needs and constraints.

Then, the coded number C 207 (also referred to as the signed certificate or data certificate) is input to the chip or other form of memory 208. One can also input Opt to 208, and it is necessary to do so whenever the knowledge of $V^{-1}$, of C, and of the format used to compose n (in particular the number of digits allocated to Opt) are not sufficient to compute Opt.

When Verifying the Authenticity of the Card:

In all cases, it is assumed that the card reader contains a chip reader CR (or more generally a reader for 208) which extracts the number C=V(n(N(R0(S))), Opt from 208.

in the case when one expects R(S) to be perfectly compatible with R0(S0), the result R(S) of the reader is sent to a processor 203, which associates with the reading of S a large number N3 at 204, as described above. Then the coded number C 207 is read using CR and sent to a processor 209 which contains the public part 210 $V^{-1}$ of the public signature scheme being used. The processor 209 computes n=$V^{-1}$(C) and separates it into N0 and Opt. The Opt part can then be used for some task depending on the application. For example, the name of the user can be displayed on some screen. The processor 209 further checks that N0 and N3 are perfectly compatible, in which case the card is recognized as authentic, whereas it is not recognized as authentic if perfect compatibility is not assessed.

in the case when one expects R(S)=R0(S0) to hold true, the result of the reader is sent to a processor 203, which associates with the reading of S a large number N at 204, as described above. Then, the coded number C 207 is read using CR and, and C and Opt are sent to a processor 209 which contains the public part 210 $V^{-1}$ of the public signature scheme and the hash function H being used. The processor 209 computes the hash H(N) of N 204, as well as n=$V^{-1}$(C), which is further separated into H(N0) and Opt. The Opt part can then be used for some task depending on the application For example, the name of the user can be displayed on some screen. 209 further checks that H(N)=H(N0), in which case the card is recognized as authentic. Otherwise, it is not recognized as authentic.

Fuzzy Reading

As in all authentication processes, the main problem in the authentication of a rightful card, or a more general object protected by this invention, is to have extremely few false positives (by which as usual is meant false positive identifications) and extremely few false negatives (by which as usual is meant illegitimate refusals of identification).

False positives are expected to be excluded by the unstability and chaotic nature of the process generating the samples. False negative are expected to be avoided either by using very stable samples and reading mechanisms allowing one to reasonably expect R(S)=R0(S0), or by being able to find a suitable value of e which would compensate for the lack of stability, supposed to be very tiny, precisely in the sense that such a e exists. One may find examples of samples and associated reading procedure which do not allow (at least within a certain time and/or budget for research) for finding values of e that allow at the same time to keep very low the number of false positive. As the samples and associated readers in this category may be significantly cheaper than others allowing for exact reading, it is explained now how the invention adapt for such cases (e.g., termed fuzzy reading cases) as well.

Fuzzy reading means that successive readings of the same sample by various allowed readers do not allow for exact reading but almost do so in the sense that one observes that, given any two samples, say A and B:

all readings of A are recognized by a vast majority of tests and/or observers to be readings from A rather than from B, all readings of B are recognized by a vast majority of tests and/or observers to be readings from B rather than from A.

Instead of the readings R(A), R(B), one can use the numbers N(R(A)), N(R(B)) constructed out of the readings as described in the case of exact reading. Examples of tests as above are measure of the Hausdorff distance between the readings considering as set of curves and/or set of numbers, measure of the results using some norm in a space usually considered a good candidate to represent such measurement (such as the L1 or L2 norm for Fourier spectra), or any other way one choose to compare sets of data.

The basic principle of this invention in the case of fuzzy reading is to compare the numbers N0 and N and control, in the spirit of what was just described, that N is reasonably close to N0, and also check that N0 and its coded version are compatible. This can be done either in the case when some hash function is used or not, according to what was described before in the exact reading case. Alternatively, on can instead compare the readings R0(S0) and R(S) and control, in the spirit of what was just described, that R(S) is reasonably close to R0(S0), and also check that N0 and its coded version are compatible.

The kind of samples used in the fuzzy case do not necessarily differ from what was described in the exact case: a large set of possibilities can be considered. For instance, the material could a variety of minerals such as rocks and glasses which are suddenly quenched from high temperatures or from the melt. Preferably, the materials include silica, silicates, various forms of calcium carbonate, amorphous semiconductors, and organic impurities placed within these materials to give them different colors and degrees of hardness. One may also protect the sample with a diamond-like carbon film.

When no hash function is used and comparison is made at the level of N3 and N0, one access N0 by performing $V^{-1}(C)$, and removing Opt if Opt has been appended to N0 before coding, as described previously, and, with reference to FIG. 2, all that has to be done besides the procedure for exact reading as already described, is to include in the processor 209 a comparison function, which, according to some test as described above, will decide if N3 is close enough to N0 to accept the card or not.

In the case a hash function is used, comparison be made either at the level of R(S) or at the level of N. We will describe successively the cases when the comparison is made on R(S) (second instance of fuzzy reading below) and N (third instance of fuzzy reading below).

Figure 3:
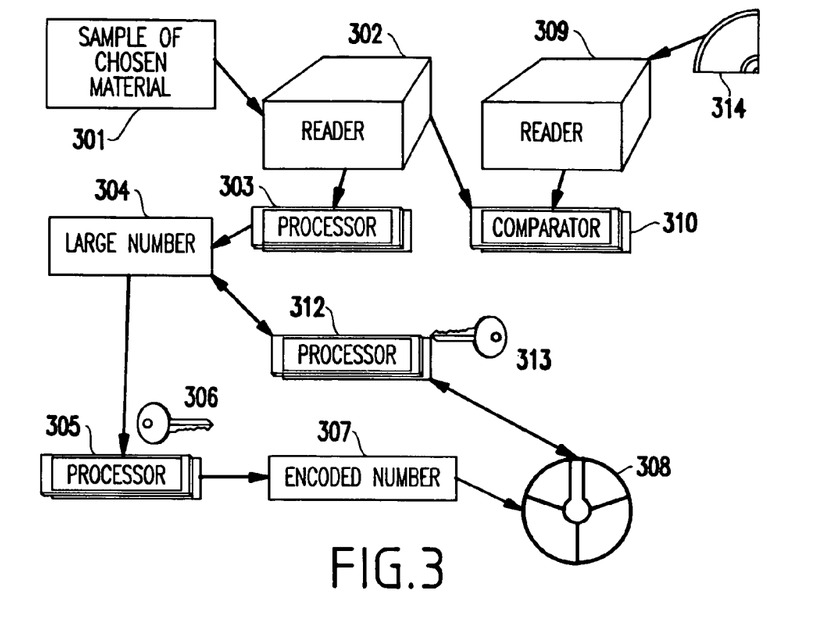
FIG. 3 is a flow diagram showing the process of equipping the smart card with the relevant supplementary information, and how to check authenticity of the card in the case of fuzzy reading when the original and actual reading can be compared directly.

With reference now to FIG. 3 corresponding to a second instance of the case of fuzzy reading, herein it is described only how the processes of creating the card and checking afterward for its authenticity differ from the case of exact reading with use of a hash function, as described previously using FIG. 2 which can be recognized as part of the diagram in FIG. 3.

At the creation time, R0(S0) is registered in memory 311 which may be does not need to be part of the chip or alternate memory at 208. At inspection, R0(S0) is read off 311 by reader 312, and R(S), as read using 202, is compared to R0(S0) in comparator 313. Assuming the authentication tests described in the exact reading case would lead to accept the card, the authentication will be achieved if and only if comparator 313 accepts R(S) as sufficiently close to R0(S0) according to some bound on difference fixed, by the designer of the card, by experimentation on the sort of sample and readers at hand.

If R(S) is accepted as sufficiently close to R0(S0), the compatibility of R0(S0) with the data in 208 is checked in the same manner the compatibility of R(S) with the data in 208 is treated in the exact reading case, as described previously (in comparison with FIG. 2, notice that it is the data from 312 instead of 202 which is sent to processor 203 in FIG. 3).

Figure 4:
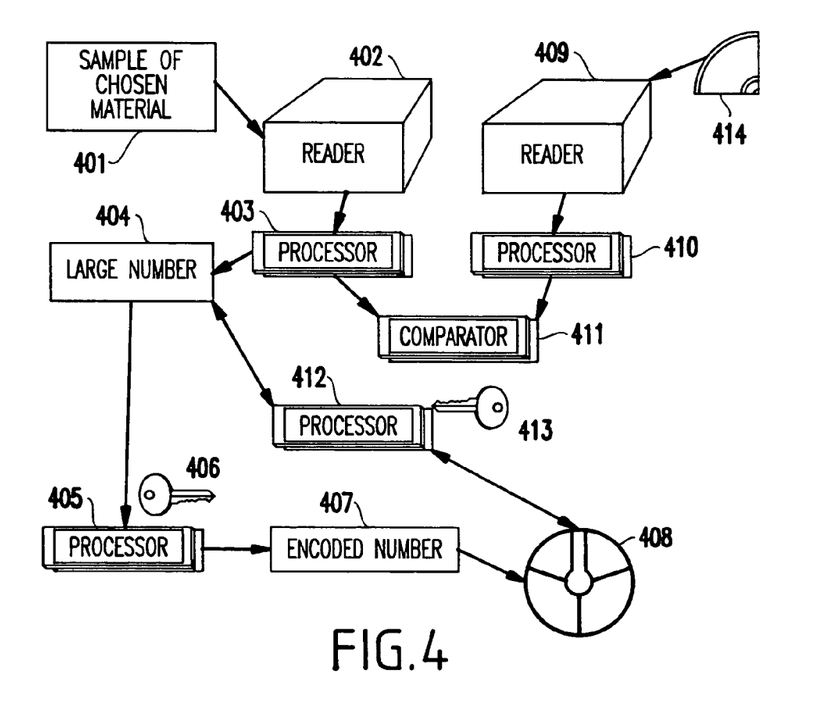
FIG. 4 is a flow diagram showing the process of equipping the smart card with the relevant supplementary information, and showing how to check authenticity of the card in the case of fuzzy reading when the original and actual reading can be compared after processing to a numerical representation.

With reference now to FIG. 4 corresponding to a third instance of the case of fuzzy reading, herein it is described only how the processes of creating the card and checking afterward for its authenticity differ from the previous cases.

As for the creation of the card, it goes as in the second instance of fuzzy reading, i.e., besides what is done in the exact reading case, one also registers R0(S0) in 311. When checking the authenticity of the card, N is extracted from R(S) at processor 414 (which is of the same nature as 203, and may be chosen to be 203 itself). Then N0, as produced by processor 203 out of R0(S0) which is read by 312 out of 311, is compared to N in comparator 413. The comparator 413 accepts N as sufficiently close to N0 according to some bound on difference fixed, by the designer of the card, by experimentation on the sort of sample and readers at hand.

If N is accepted as sufficiently close to N0, the compatibility of N0 with the data in 208 is checked in the same manner the compatibility of N with the data in 208 is treated in the exact reading case, as described previously. This case can be simplified by storing N0 instead of R0(S0) in 311, in which case, the processor 203 is not needed at inspection time, when 312 sends information to both 204 and 413 directly.

Making Readings More Reproducible

Exact reading may be hard to achieve because of a variety of reasons. For instance, the sample can suffer from wear and tear because of repeated use. If alterations are only expected on the surface of the samples, the information content on the surface can be discounted (e.g., by using a combination of transparency and reflective measures in the optical reading case) so that one gets back to an exact reading situation (which is preferable, except possibly for cost considerations) by considering only the information content of the bulk of the sample.

Another method is to use statistical methods sufficiently robust to accommodate small changes in the sample. Using the notation VEC1(v1, v2, . . . , vQ) defined previously, let vk (or vk(S) if the dependence on the sample needs to be made explicit) be the measurements on the sample. These stochastic variables have distributions which can be determined during the production of the sample. In particular, the average Ak of vk(S) (where an average is taken over several samples) is known and a little window Wk around Ak with very high probability to contain the actual reading can be determined. This vector of information (Ak, Wk) is stored on the card.

Accordingly, the modified procedure for authentication of the card is as follows. The first step is to determine whether the percentage of readings vk which are in their window Wk is above a specified threshold (it is expected that alterations similar to scratches will only effect a low percentage of the measurements vk(S)). If so, then further testing of the card is performed, otherwise the card is rejected. For some stochastic processes, for instance Gaussian processes one can use the variance instead of windows for comparison, to judge compatibility of readings. Some stochastic processes may allow more adapted measurements as is well known in the art of statistics.

Beside averages taken over a variety of samples, spatial averages can also be used to construct a method which is robust to slight alterations of the sample. For example, assuming that the sample is a thin square box, the box is partitioned into a large number of very thin vertical slices, Sk. The measurement vk(S) will be the average over the slice Sk of a local property of the sample. For example, the average intensity of some measurement such as light intensity. Scratches will only effect slices in very small areas, and hence will effect the average only slightly. This is especially the case when the average is taken over the whole volume of the slice (e.g., when the fact that the sample is three-dimensional is fully explored). A statistical analysis will determine the minimal size of the slices such that, with very high probability, scratches will not effect the first digit dk of the measurement vk(S). Now, the number N(R(S)) formed by concatenating the digits dk, k=1, . . . , L, is used as a robust numerical representation of the sample Alternatively, S may be expected to evolve in its bulk or the surface corrections cannot be isolated and neglected. Another a priori obstacle to exact reading is that R0 may be more expensive or difficult to operate than other readers of similar data out of the samples. In such a case, exact reading may be restored by proper choice of the parameter e, but one may instead choose to use the fuzzy reading procedure.

The Case of Samples Which Degenerate

Another phenomenon to be considered is that the sample may naturally evolve, for instance degenerate in some way (such as the growth of cracks, the dynamics of defects, etc.). Such samples (e.g., comprising unstable chemicals) may nevertheless be chosen for some applications, either because they correspond to cheaper solutions, or because the evolution can be used to limit a priori the lifetime of the validity of the card, or a combination of both reasons.

Thus, this invention also generalizes to samples S0 that change due to other processes. Here are some examples:

With samples constructed of a material such that the sample decays and becomes unreadable after a certain amount of time, the invention becomes a way to produce unforgeable unalterable credentials that expire after a certain time because the S0 itself will change.

With samples placed on a material that is destroyed as part of some user action (such as the seal on some box, which need to be broken to open the box without otherwise damaging the box), the invention becomes a way to produce unforgeable, unalterable credentials that also assert that some action has or has not occurred.

Statistical learning of variations in the sample S on the card can be used to further verify the authenticity of the card. The chip on the card contains the time of fabrication. When the degeneration process is predictable, the particular sample on the card is expected to degenerate in a way similar to what was statistically learned. Thus, the reader can read the time stamp and the sample to verify that no negative-degeneration has occurred (e.g., the quality of the physical sample has not improved over time which would be a clear indication of tampering or an attempt to duplicate the card).

The cases when degeneration may occur necessitate special considerations, especially if validity of the card needs to be prolonged after degeneration has observable effects on the reading of the samples.

Hereinbelow, the entropy of "the change" in N(R(S)) is reduced to ensure that the reading N(R(S)) is close in an appropriate distance measure sense to N0(R0(S0)). This can be done by using what can be learned when studying the statistical properties of "the change" in N(R(S)) and preferred methods of doing so are presented.

Experiments are conducted on a representative set, containing a large number of physical samples. The numbers N(R(S)) are read from the samples initially and at a different time and by using different fuzzy readers. The set of error vectors X=D(N(R(S)), N0(R0(S0))) is derived, where D is the distance metric between two vectors. The statistical properties of the error vector X can now be derived and used for identifying the high entropy components (where this alternate entropy is also used in the theory of Principal Component Analysis (PCA) as discussed in "Principal Component Analysis" by I. T. Jolliffe, Springer-Verlag, New York, 1986). By dropping the high entropy part, it is ensured that the remaining entropy in the resulting error vector X is small enough, which enables using a comparator with a small threshold.

For the case when D(.,.) is the Euclidean distance measure between vectors, one method of reducing variation is the method of PCA. The eigen-vectors and corresponding eigen-values of the covariance matrix of the normalized difference vector set of vector X can be derived. The high variance components lie in the direction of eigen-vectors which correspond to large eigen-values. They are discarded by taking the projection of the vector X on the plane orthogonal to all these eigen-vectors. This results in an error vector with variance reduced by the total sum of the eigen-values corresponding to the dropped eigen-vectors.

The reader 202 is modified in this case. It also contains the chosen eigen-vectors now. When a card is read, an error vector is derived as $$X=D(N(R(S)), N0(R0(S0))).$$

The high entropy components of it are dropped, which defines a projection vector KX and associated projection operator K, and then the remaining entropy is compared against a threshold. The card is authenticated further with the cryptographic key, only when the remaining entropy in X is less than a certain threshold. Otherwise, it is rejected as a fake card.

In an alternative embodiment, when the entropy in the projection KX, of the error vector X, is approximately 0, the entropy of the projected KX need not be compared with the threshold. Here again, K is the projection matrix when distance measure is Euclidean and PCA is being used. Since, with negligible loss of precision, $$KX=K(N-N0)=0,$$

then KN=KN0. The KN0 part is termed the stable part of N0. In this case, the vector N0 can be replaced by its stable part KN0, and V(n(KN0(R0(S0))), Opt) is stored on the card instead of V(n(N0(R0(S0))), Opt). The reader 202 which knows K, now derives the stable part KN(R(S)) of N(R(S)) and performs the cryptographic key authentication as previously described. In this case, the comparator on the reader is not required and N0(R0(S0)) need not be stored on the card so that the architecture is similar to FIG. 2, except for the modification described of the reader 202. Clearly, using external data which is not known to the reader proceeds as described above.

Preventing Alteration Attacks

Thus, in the exemplary implementation directed to smart cards, the present invention prevents smart cards from being duplicated, but the unscrupulous counterfeiter may still attempt to maliciously alter the card.

That is, one is still exposed to attacks like the well-known "jackpotting" schemes that plagued old automated teller machine (ATM) cards, which contained an authenticated account number and authenticated personal identification number (PIN), but no binding between the two. An adversary could thus create a fake card with the victim's account number, but the adversary's PIN, and drain the victim's account.

With the basic invention as disclosed herein, an adversary who obtained the signed certificate C on N(R0(S0)) could then modify his card by removing the chip, and (as has been demonstrated) lay conductive foil (or the like) from the chip pads out to some convenient place on the end of the card, and hook the foil up to a computing devise, preferably small such as an IBM Workpad or a Palm Pilot. The resulting device would still be accepted as authentic (because the chip emulator running on the Palm Pilot or similar device could provide a valid signature matching the S0 on the card), but could now engage in arbitrary functionality.

The present invention generally addresses this problem by using the aforementioned "optional data" Opt included in the card's physical state certificate to bind the card's physical state to its specific application state and functionality.

More specifically, the smart card can be thought of as a physical token which carries a function F and an application state X. When the smart card is inserted into a bona fide reader, the reader provides some type of input R (e.g., a function of some transformation of X or the like). The smart card then transforms its internal state to:

$$(F',X')=F(X,R)$$

With the current state of smart card technology, the adversary can easily monitor (and possibly alter) the exchange of data between the card and reader, and probably read and alter both F and X.

However, the present invention overcomes this problem. Specifically, each reader will have a key pair ($V_R$, $V_R-1$): typically, whoever is administering this application will oversee the generation and/or distribution of these key pairs. The provider can be the manufacturer or a third party. Also notice that readers could have multiple key pairs, for different applications. The invention extends each card's state certificate to include F and X, signed with $V_R$. Notice that there is really no specific requirement that the certificate be carried on the card: in theory, it could be anywhere, as long as the most up at the recent one ends reader, but on the card is the most natural place.

When the card is inserted into a reader, the card authenticates the reader (e.g., by establishing an encrypted channel or the like), and then uploads to the reader its current X, F, and state certificate C.

The reader then reads N(S0), verifies that the state certificate is correctly signed, verifies that the state certificate matches F, X, and N(S0), calculates (F', X')= F(R, X), produces and signs new state certificate C' attesting to F' and X', and downloads C', X', and F' back to the card.

This general process can be extended in various ways. For example, the readers can use secure or tamper-resistant hardware to protect the secrecy of their private keys and data, and the integrity of their computations.

Rather than sharing a common key pair, the readers can each have their own key pair, with each public key certified by a certificate authority (CA), where these CA's fit into some trust hierarchy, so different readers can verify each other's certificates. In these cases, the signed state certificate C that the reader sends to the card would implicitly be paired with sufficient certificates and/or certificate names so that another reader could verify the state certificate.

The application state X can include the identity (or some function of the identity) of the reader(s) that most recently wrote X. (This "identity" could be deduced from the various certificates/names attached to the signed state certificate.)

Preventing Replays

These approaches where the card's state certificate can change over time may sometimes be vulnerable to "replay" attacks, in which the adversary saves an old X and state certificate C (binding X to S0) and (at some opportune time for the adversary) replaces the card's current X' and C' with the old X and C. However, the present invention has a natural extension which addresses attacks. Some readers can be equipped with a physical process to change the card's physical S0 (or S) to some alternate S0'. The reader would carry out this change, and calculate C' (instead of C) based on S0' instead of S0. This prevents the adversary from fraudulently restoring the card's application state to some previous state. Possible embodiments of this approach include having the reader explicitly regenerate or randomly modify S or having the reader delete or otherwise destroy some Si in a sequence of Si's on the card, or having the reader delete or otherwise destroy some Si in a more general set of S is (e.g., perhaps organized into a tree) on the card.

Unbinding C from Objects

The foregoing examples all obeyed two rules:

Rule #1: a one-to-one mapping existed between state certificates C, states X, and physical sample S0, Rule #2: the state certificate C and state X were located on the same card as the sample.

However, the present invention can be extended to scenarios where one or both of these rules no longer apply. Some examples are provided below.

For an example scenario where rule #1 no longer applies, consider employees of a large, decentralized organization with many different access privileges, each controlled by a different authority. In this case, the card with its sample S0 is an identification badge issued to each employee. The pair (X, C) is a statement asserting that the carrier of the badge with the specified sample has been authorized for a certain access privilege. The C was signed by the authority for that privilege. Each badge now can carry many (X,C) pairs, one for each privilege that employee currently has. This would replace existing systems where each employee must carry a separate badge for each privilege.

For an exemplary scenario where rule #2 no longer applies, consider a scenario where a credential (such as an automobile title) must be logically bound to a physical object (e.g., the automobile), but have different physical properties (e.g., the title needs to be easily portable). Here, the "card" with the sample is the physical object the (X, C) is the assertion of ownership of the object with the sample S0.

For an example scenario where neither rule applies, consider a card that asserts which set of physical objects (e.g., portable computers, or library books, or art works) a particular user is allowed to remove from a site. Each object Oi has a sample Si. The card would carry state X (indicating the set of Oi for which that user is authorized) and a certificate C that binds that X to those Si's.

All of the above variations can be generalized by straightforward techniques to make the reader/card transaction partially or fully atomic, in the sense that the respective change from S0, X, F, C to S0', X', F', C' happens completely, or not at all, despite failures and attacks (e.g., such as a user substituting a different card midway through the transaction).

Thus, as mentioned above, as one example of this invention, smart cards can be used as authentication tokens based on public key cryptography with some card-specific key pair. The card carries in its internal "secure" store, a certificate attesting to its public key and identity, signed by the authority over cards. An adversary who obtains the private key (e.g., by Kocher's power analysis or Kuhn's physical probe, as described for instance in the above-mentioned references R. Anderson, M. Kuhn; "Tamper Resistance—A Cautionary Note." *The Second USENIX Workshop on Electronic Commerce*, November 1996, R. Anderson, M. Kuhn; "Low Cost Attacks on Tamper Resistant Devices." *Preprint.* 1997, and P. Kocher, J. Jaffe and B. Jun; "Introduction to Differential Power Analysis and Related Attacks" *Manuscript*, Cryptography Research, Inc. 1998) can clone cards. The present invention addresses this risk by including the public key and card identity in the application state X included in the card's state certificate. As described above, a reader interacting with this card could verify that the card is authentic, from N(S). It could then proceed to carry out the application-specific cryptography protocol with the key pair.

It is noted that in both the exactly readable and the fuzzily readable cases, several coded numbers can be recorded in the card to extend its security, and recorded on and/or out of the chip. In particular, the present invention can be used several times in a single card, possibly in conjunction with other security mechanisms.

Other Implementations

Having described in great detail how the present invention can be implemented for smart cards, described hereinbelow more briefly are other instances of its applicability.

In the case of a telephone card, several physical samples will be put on the card, one for each unit of payment. Each sample $S_i$, i=1, 2, ... N, is paired with its coded numbers $N(S_i)$. To pay for a unit, a pair $(S_i, N(S_i))$ is destroyed by the reader or another tool associated to the reader. For increased security, a piece of $S_i$ can be destroyed, transforming $S_i$ into a new sample $S_i'$ with a coded version $N(S_i')$, and the transaction can be completed when the pair $(S_i, N(S_i'))$ is also read. All the numbers $N(S_i)$, and if needed the $N(S_i')$s can be stored in a smart card, but other types of writing and corresponding reading can be used such as a bar code, magnetic tape, etc. It is noted that the members $N(S_i)$ of the pairs need not be destroyed, as long as the samples $S_i$ are destroyed.

As another example of the present invention, rather than telephone cards whose stored value strictly decrements over time, smart cards may be used as "electronic wallets" whose stored value can both decrease and increase over time depending upon the fortunes of the user. Using the generalized invention with X as this stored value permits the values to change arbitrarily at each official reader/card interaction, but prevents an adversary from otherwise modifying or cloning this value. Using the extension with changeable S0 further prevents the adversary from fraudulently restoring an older (and perhaps larger) stored value.

Uses of the present ideas in the context of counterfeiting and grey market protection could be easily implemented by anybody versed in the art of using cryptographic methods, after learning the teaching of the above-mentioned U.S. patent application Ser. No. 09/060,026. Thus, a precise implementation is avoided herein in the general framework of object authentication, but rather presented is a context where the use of the present invention would be particularly efficient. Much digitally recorded material, computer software, games, audio content, video content, etc. is abundantly counterfeited and/or are susceptible of much more such attacks.

If the support of the recording is equipped with a sample and carries a coded version on the number obtained by reading the sample, as described above in the smart card context, and if correspondingly the readers of such digital contents are complemented as proposed for smart card readers, counterfeiting becomes extremely difficult, if not virtually impossible.

It is noted that the system of the present invention protects smart cards and other objects with cryptographic keys and that cryptographic keys can eventually be broken. To diminish such exposure, a date can be attached to the object and an updated key can be used, as has been disclosed. In such a case, the reader is regularly provided with the new public keys to be able to adapt to new generations of encryption. As oftentimes digital contents lose value with time (e.g., when they go out of fashion or they are no longer considered technologically "new"), the legitimate originator of digital media is thus essentially protected.

The present invention also would be beneficial for video disks to record and distribute video images. For example, the video disk scenario introduces the problems of keeping honest customers from mistakenly accepting pirated disks as real, and keeping dishonest customers (but who will not modify their hardware) from making unauthorized copies of commercial disks. To be feasible, any proposed solution must abide by the constraint that compromise of any "black box" in the field should not threaten the overall system.

The extensions of the present invention addresses these problems, while satisfying this constraint. Each disk player/recorder is a "reader," with its own internal key pair, the public key of which is certified by a root private key. The player/recorder carries with it its certificate and a copy of the root public key.

The set of player/recorders is partitioned into two subsets: home units (e.g., for the mass market) and studio master units (e.g., for commercial movie studios). Each device's certificate indicates the subset of which it is a member.

Each disk is (or contains) a "card," with a changing sample S0, whose state certificate has appended to it the certificate of the player/recorder that signed this disk, and whose state X includes the contents of the disk, as well (via this appended certificate) as to which subset the recording device belonged.

When a player/recorder records a disk, it signs a new state certificate and appends its own certificate. Before a player/recorder plays a disk, it verifies the state certificate and recorder certificate on the disk. If these do not verify, the player refuses to play the disk.

If the state certificate and recorder certificate do verify, the player plays the disk. However, if the disk's certificate indicates that the disk was signed by a mass-market unit, the player displays a predetermined (e.g., red) light. If the disk's certificate indicates that the disk was signed by a studio master unit, the player displays another predetermined (e.g., green) light. Honest customers will know that genuine commercial disks should play with a green light, and anyone who "hacks" their own mass-market disk player will not gain the ability to forge studio-master disks.

In one variation of this disk application, not only the subset is included, but the full identity of the recording device, providing a traceable mark of who recorded the pirated disks.

In another variation, the state X can include explicit rules R about copying or reproducing the disk, and the transformation function F can include how to change these rules when copying. (For example, R might be an integer indicating the number of times a disk can be copied. A "dubbing" disk player/recorder can refuse to copy a disk with R=0, but otherwise will copy a disk and change R to R'=R−1 on the copy.)

While the overall methodology of the invention is described above, the invention can be embodied in any number of different types of systems and executed in any number of different ways, as would be known by one ordinarily skilled in the art.

Figures 5, 6:
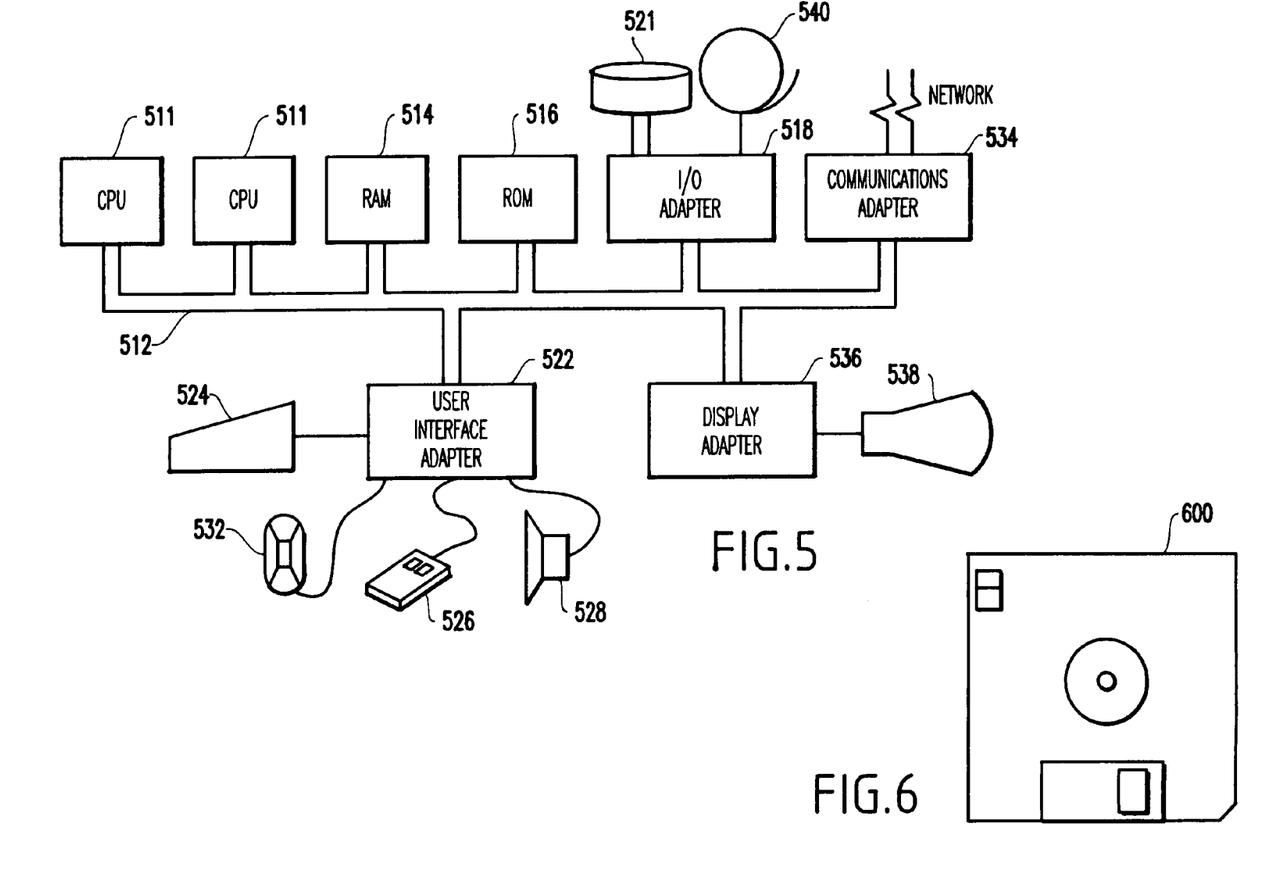
FIG. 5 illustrates an exemplary information handling/computer system for use with the present invention.
FIG. 6 illustrates a storage medium 600 for storing steps of the method according to the invention.

For example, as illustrated in FIG. 5, a typical hardware configuration of an information handling/computer system for use with the invention, preferably has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, an input device such as a mouse, trackball, joystick, touch screen, etc. 526, speaker 528, microphone 532, and/or other user interface device to the bus 512), communication adapter 534 (for connecting the information handling system to a data processing network such as an intranet, the Internet (World-Wide-Web) etc.), and display adapter 536 (for connecting the bus 512 to a display device 538). The display device could be a cathode ray tube (CRT), liquid crystal display (LCD), etc., as well as a hard-copy printer.

In addition to the hardware/software environment described above, a different aspect of the invention includes a computer-implemented method for guaranteeing authenticity of an object. As an example, this method may be implemented in the particular environment discussed above.

Thus, as shown in FIG. 6 in addition to the hardware and process environment described above, a different aspect of the invention includes a computer-implemented method for guaranteeing authenticity of an object, as described above. As an example, this method may be implemented in the particular hardware environment discussed above.

Such a method may be implemented, for example, by operating the CPU 511 (FIG. 5), as a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform a method of guaranteeing authenticity of an object (e.g., smart card, etc.).

This signal-bearing media may include, for example, a RAM (not shown in FIG. 5) contained within the CPU 711 or auxiliary thereto as in RAM 514, as represented by a fast-access storage for example. Alternatively, the instructions may be contained in another signal-bearing media, such as a magnetic data storage diskette 600 (e.g., as shown in FIG. 6), directly or indirectly accessible by the CPU 511.

Whether contained in the diskette 600, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

To illustrate the large versatility of the present invention, it is recalled that the chip used as a preferred medium to record the state certificate C replaced by any form of memory, even as simple as a piece of paper where C could be written using bar-codes and or plain text. Thus, it is believed that the present invention will have extremely general applicability in the fight against counterfeiting as well as grey market. In particular, application to secure remote printing are provided in U.S. patent application Ser. No. 09/398,029, filed on Sep. 17, 1999, commonly assigned with the present application, and entitled "METHOD AND APPARATUS FOR SECURE SALE OF ELECTRONIC TICKETS" by Howard et al. and in U.S. patent application Ser. No. 09/398,028, filed on Sep. 17, 1999, also commonly assigned with the present application, and entitled "METHOD AND SYSTEM FOR REMOTE PRINTING OF DUPLICATION RESISTANT DOCUMENTS" by Gordon Wesley Braudaway, et al., each incorporated herein by reference in their entirety.

While the invention has been described in terms of a several preferred embodiments, those skilled in the art will recognize that the invention can be practiced with modification within the spirit and scope of the appended claims.

The invention claimed is:

1. A method of guaranteeing authenticity of an object that includes or has attached thereto at least one of a chip with a recording support and another recording support, said method comprising:

attaching to said object a first sample of material obtainable by at least one of a chemical process and a physical process having a characteristic that samples generated by said process are random and non-reproducible, said first sample being associated with a first number obtained by reading said first sample using a first reader of a specific sort;

recording, on at least one of said recording supports, at said time of production, in an exactly readable way, a representation of said first number so that said first number can be checked against a later reading made with any reader of said specific sort at each time of verification of said object, thereby providing a first verification that verifies that a sample being read at said verification of said object is indeed said first sample; and forming, at said time of production, at least one encrypted version of said first number, at least one of said encrypted versions of said first number being also recorded in an exactly readable way on said object at said time of production, said at least one encrypted version of said first number being obtained by a method from public key cryptography, said recording of said at least one encrypted version thereby providing a second verification that verifies at said verification that said encrypted version of said first number was generated by an authorized party, wherein information concerning said public key cryptography method is available so that said second verification can be made by anyone of an intended public and said first number is recorded as an unencrypted number.

2. The method according to claim 1, wherein said object comprises a smart card.

3. The method according to claim 2, wherein said smart card incorporates a chip.

4. The method according to claim 1, further comprising:
reading, by a reader, the sample in an imprecise manner, meaning that sequential readings are not exactly the same as an initial reading of said sample, but collecting, at a time of preparation of the object more information about said sample than will be contained by decoding any of said coded version of that information,
wherein said object carries a chip and a recording of a digital representation of the fill information initially collected of the sample from the reader used at the time the object is prepared.

5. The method according to claim 4, further comprising:
sending a result of the reader to a processor, which associates with the reading of the sample said number;
sending said number to a second processor containing a secure hash function, details of which are made public, and a secret part of said key signature, said key signature comprising a public key signature, wherein said second processor computes a coded version of the hash of said number appended with a predetermined, optional data; and
outputting said coded version to said chip.

6. The method according to claim 5, wherein upon introducing the object into a second reader, a different reading of said sample occurs such that the first reader reads the sample to deliver R(S) and the second reader reads the sample to deliver R0(S0), said method further comprising:
determining by a comparator whether the readings by said first and second readers are less than or equal to a predetermined threshold to accept the object, at least temporarily, as authentic.

7. The method according to claim 6, further comprising:
reading said coded version by said chip and verifying said coded version against said number by using a public part of the public key signature; and
if said number and said coded version read by said chip are compatible, accepting the object as authentic.

8. The method according to claim 4, further comprising:
delivering by said reader an actual reading R(S) and delivering by a second reader an original reading as R0(S0);
processing said readings by first and second processors to deliver N(R(S) and N(R0(S0)), respectively; and
determining by a comparator whether outputs from said first and second processors have a value no more than a predetermined threshold, to temporarily accept the object as authentic.

9. The method according to claim 8, further comprising:
reading the coded version in said chip and verifying said coded version against said number by using a public portion of a public key signature; and
if the information in said number and that read in said chip are compatible, accepting said object as authentic.

10. The method according to claim 1, further comprising:
sensing a degeneration of said sample.

11. The method according to claim 10, wherein said sensing includes comparing a difference between an actual reading vector and an original reading vector against a threshold;
forwarding a result of the reader to a processor, which associates with the reading of said sample a transformed vector K(N0(R0(S0))), where K is a transformation matrix; and
forwarding the transformed vector to a second processor including a secure hash function, details of which are made public, and a secret part of a public key signature scheme.

12. The method according to claim 11, wherein said object includes a chip, and wherein said second processor computes a coded version of the hash function of the transformed vector appended with predetermined external data, to provide a coded number, said coded number being put on said chip,
wherein upon introducing the object to a second reader, a predetermined different reading of the sample is performed.

13. The method according to claim 12, wherein an actual reading made by a first reader is transformed into a transformed vector KN, and wherein an original transformed vector KN0 is delivered by a second reader, and
wherein the transformed vector, KN is compared against the original transformed vector KN0 by a comparator such that if the two transformed vectors have a value within a predetermined closeness, the object is temporarily accepted as authentic.

14. The method according to claim 13, further comprising:
reading by said chip the coded version and verifying said coded version against the transformed vector using a public part of the public key signature; and
accepting the object as authentic if the transformed vector and the coded version read in said chip are compatible.

15. The method according to claim 1, wherein said object being authenticated comprises a piece of paper.

16. The method according to claim 1, wherein a sequence of data associated with said sample, said sample, and certificates associated with said sample and said data are precomputed.

17. The method according to claim 16, wherein new data and its certificate are computed dynamically.

18. The method according to claim 16, wherein said data is selectively changeable when said sample is changed.

19. The method according to claim 1, wherein said key signature includes using private key cryptography.

20. The method according to claim 1, wherein said specific reader captures information out of the sample by one of a scanning and globally.

21. The method according to claim 1, wherein said sample includes at least one of an exposed face of a mineral sample and an exposed face of a glass sample, selectively covered by a carbon film and affixed to said object.

22. The method according to claim 1, wherein said coded version of said number includes at least one of optional data appended to said number and a hash of said number with said optional data.

23. The method according to claim 1, wherein data linked to the sample of material is selectively changeable during at least one reading subsequent to an initial reading of said sample at said time of production.

24. The method according to claim 1, wherein said sample of material is selectively changeable over time.

25. The method according to claim 1, wherein said data is selectively changeable when said sample is changed.

26. The method according to claim 1, wherein new data associated with said sample and a certificate of said sample are computed dynamically.

27. The method according to claim 1, wherein at a time of creation of said object, said coded version of said number is stored in memory for later comparison when said object is presented for authentication.

28. The method according to claim 1, wherein a plurality of coded versions of numbers are recorded into said object.

29. The method of claim 1, wherein said forming at least one coded version of said number further comprises using additional information for said forming said coded version, wherein said additional information comprises the date of issue of said object.

30. The method of claim 1, wherein said forming at least one coded version of said number further comprises using additional information for said forming said coded version, wherein said additional information comprises the functionality of an application of said object.

31. The method of claim 1, wherein said first number is encrypted in combination with further information, said further information and all encrypted versions of said first number being also recorded in an exactly readable way on said object at said time of production.

32. The method of claim 1, further comprising:
forming at least one second encrypted version of said first number by a private key cryptography encryption scheme; and
recording said at least one second encrypted version in an exactly readable manner on said object.

33. The method of claim 1, wherein said first number is converted into and recorded in a base 3 number format.

34. A method of guaranteeing authenticity of an object, said object including at least one of a chip having a first recording support and a second recording support, said method comprising:

providing a sample of material obtainable only by at least one of chemical and physical processes such that a measurable characteristic of said sample is random and not reproducible and affixing said sample to said object;

using a reader to take a measurement of said characteristic of said sample, said measurement becoming a number reproducibly associated to said sample; and to allow for sample-reader combinations such that the number associated to said sample is not exactly reproducible at a time of verification, recording said number as an unencrypted number read by said reader on said object on at least one of said first recording support and said second recording support, wherein said process provides a sale that degenerates over time in a manner that can be measured and said number is recorded on said object along with a time stamp when said reading occurs, and wherein a subsequent reading of said sample is used to determine whether a negative-degeneration has occurred for said sample, said negative-degeneration indicating that a tampering has occurred to said sample.

\* \* \* \* \*